United States Patent
Takaluoma et al.

(10) Patent No.: US 7,493,373 B2
(45) Date of Patent: Feb. 17, 2009

(54) PROVIDING SERVICE DISTRIBUTION BETWEEN DISTRIBUTED APPLICATIONS

(75) Inventors: Antti Takaluoma, Oulu (FI); Petri Kangas, Oulu (FI)

(73) Assignee: Nokia Corporation, Espoo (FI)

(*) Notice: Subject to any disclaimer, the term of this patent is extended or adjusted under 35 U.S.C. 154(b) by 822 days.

(21) Appl. No.: 11/023,315

(22) Filed: Dec. 27, 2004

(65) Prior Publication Data

US 2006/0142005 A1    Jun. 29, 2006

(51) Int. Cl.
*G06F 15/16* (2006.01)

(52) U.S. Cl. .............. 709/217; 709/219; 709/223; 707/9; 707/100; 715/758

(58) Field of Classification Search ........... 709/217, 709/218, 219, 223–226; 707/9, 10, 100; 715/758

See application file for complete search history.

(56) References Cited

U.S. PATENT DOCUMENTS

| | | | |
|---|---|---|---|
| 6,266,708 B1 * | 7/2001 | Austvold et al. | 719/315 |
| 6,898,199 B1 * | 5/2005 | Silva et al. | 370/352 |
| 7,082,116 B2 * | 7/2006 | Reza et al. | 370/338 |
| 2004/0076175 A1 | 4/2004 | Patenaude | |

FOREIGN PATENT DOCUMENTS

| | | |
|---|---|---|
| EP | 1 014 249 | 6/2000 |
| WO | WO 02/058253 | 7/2002 |
| WO | WO2004/040918 | 5/2004 |

* cited by examiner

*Primary Examiner*—Bunjob Jaroenchonwanit
*Assistant Examiner*—Van Kim T Nguyen
(74) *Attorney, Agent, or Firm*—Foley & Lardner, LLP

(57) ABSTRACT

A system is provided to facilitate distribution of a service between a first application and a second application. The system includes a remote socket object, a service registry, and a service mapper. The service mapper receives notification from the service registry indicating registration of the remote socket object created in response to a request for a service at the first application. The service mapper requests an active subscription list from the service registry and selects a subscription record from the active subscription list. The subscription record is associated with the second application. The service mapper sends the selected subscription record to the second application using a remote device port mapped to a localhost port and receives a service record from the second application including a socket for communicating with the second application. The service mapper sends a modified service record that includes a localhost socket mapped to the socket to the service registry that registers the second application using information from the modified service record.

26 Claims, 6 Drawing Sheets

PROVIDING SERVICE DISTRIBUTION BETWEEN DISTRIBUTED APPLICATIONS

FIELD OF THE INVENTION

The present invention is related to connectivity between applications. More specifically, the present invention relates to the distribution of services between distributed applications that may be executing at remote devices.

BACKGROUND OF THE INVENTION

In addition to processing voice calls from both wired and wireless phones, handheld communication devices now also communicate with other types of devices such as computers of all form factors, Personal Digital Assistants (PDAs) or handheld PCs, Integrated Communication Devices (ICDs), etc. Additionally, communication devices have merged the capabilities of cellular telephones, PDAs, ICDs, and computing devices and now provide increasingly sophisticated applications. Applications provide the communication device with the ability to perform a wide variety of tasks including drafting documents, preparing presentations, creating movies and music, taking pictures, maintaining schedules, connecting to the Internet, etc. For example, the communication devices can be connected to the Internet using cellular network connections and standard Internet Protocols (IP). Some of these applications may be distributed between multiple devices through various network connections.

Devices can be connected using any communication media including Radio Frequency wireless (including Radio Frequency IDentification (RFID)), phone line, power line, Infrared Data Association (IrDA), Ethernet, and Institute of Electrical and Electronics Engineers (IEEE) 1394, etc. Thus, any communication medium that can be used to network devices can enable distribution of application services between devices.

The IEEE establishes industry wide standards designed to resolve compatibility issues between manufacturers of various electronic equipment. The IEEE 802.11™ specifications define wireless standards for Wireless Local Area Networks (WLANs) that provide an "over-the-air" interface between a wireless client and a base station or access point, as well as among other wireless clients. Wireless Fidelity (WIFI) denotes a set of WLAN standards developed in support of the IEEE 802.11™ specifications. The 802.11 WLAN concept is based on a cellular architecture such that the system is subdivided into cells that are controlled by a base station known as an access point. Multiple cells may be joined through their access points typically using Ethernet, but possibly using wireless technology or other network technologies.

The IEEE 802.15 Working Group provides standards for low-complexity and low-power consumption Wireless Personal Area Networks (PANs) such as those supported by the Bluetooth specification. The Bluetooth Special Interest Group (SIG) is driving the development of Bluetooth as a specification for low cost, short-range (0.1-100 meters) wireless communication between two devices. Bluetooth™ wireless technology supports both point-to-point and point-to-multipoint connections. A Bluetooth™ wireless technology transceiver in communication devices allows communication in a PAN or an ad hoc network. The architectural protocol layers of a Bluetooth wireless communication system include the Host Control Interface (HCI), the Logical Link Control and Adaptation Protocol (L2CAP), the RS232 Serial Cable Emulation Profile (RFCOMM), the Service Discovery Protocol (SDP), and the Object Exchange (OBEX) Protocol.

The utility of the communication devices, however, has been limited due to relatively poor implementations of local connectivity in the devices. For example, the standard Bluetooth profiles have been effective when a cable replacement is needed as in when a headset is implemented wirelessly. However, other Bluetooth profiles, including OBEX, Vcard, calendar, and ftp that can be used by some applications for transporting business cards, calendar events, or files, have met with less success due to inadequate standardization. As a result, it has been difficult to develop applications that implement these functions. Additionally, the Bluetooth standard profiles limit the functionality provided. The Bluetooth lower level interfaces such as RFComm and L2CAP may be used, but programming at this level is difficult, requires specific Bluetooth expertise, and introduces development risks. For example, different devices may support different Bluetooth implementations. As a result, an application developed for a first device may not execute properly when installed on a second device. Additionally, the second device may not support Bluetooth at all. Instead, the second device may use infrared Universal Serial Bus (USB) connectivity, Ultra Wideband connectivity (UWB), WIFI connectivity, etc. The connections additionally may be wired or wireless.

Thus, what is needed is a method of distributing services between devices that support various connectivity standards independent of the connection standard so that applications do not require modification when new connectivity standards become available or are implemented in different devices. What is further needed is a method for distributing services that bridges the current gap between link specific communication and Internet Protocol (IP) communication.

SUMMARY OF THE INVENTION

An exemplary embodiment of the invention relates to a service mapping method for facilitating distribution of a service between a first application and a second application. The method includes, but is not limited to, receiving a first notification from a service registry, the first notification indicating registration of a remote socket object, the remote socket object created by a service mapper in response to a request for a service at a first application; requesting, by the service mapper, one or more active subscription from the service registry; receiving, by the service mapper, the one or more active subscription from the service registry; selecting, by the service mapper, a subscription record from the received one or more active subscription, the subscription record associated with a second application and with the request for the service at the first application; sending the selected subscription record from the service mapper to the second application using a remote device port mapped to a localhost port; receiving, by the service mapper, a service record from the second application, wherein the service record includes a socket for communicating with the second application; modifying, by the service mapper, the received service record to include a localhost socket mapped to the socket; and sending the modified service record to the service registry from the service mapper, wherein the service registry registers the second application using information from the modified service record to facilitate distribution of the service between the first application and the second application.

Another exemplary embodiment of the invention relates to a computer program product for facilitating distribution of a service between a first application and a second application. The computer program product includes, but is not limited to, computer code configured to receive a first notification from a service registry, the first notification indicating registration of a remote socket object, the remote socket object created in response to a request for a service at a first application; to request one or more active subscription from the service registry; to receive the one or more active subscription from the service registry; to select a subscription record from the received one or more active subscription, the subscription record associated with a second application and with the request for the service at the first application; to send the selected subscription record to the second application using a remote device port mapped to a localhost port; to receive a service record from the second application, wherein the service record includes a socket for communicating with the second application; to modify the received service record to include a localhost socket mapped to the socket; and to send the modified service record to the service registry, wherein the service registry registers the second application using information from the modified service record to facilitate distribution of the service between the first application and the second application.

Still another exemplary embodiment of the invention relates to a device for facilitating distribution of a service between a first application and a second application. The device includes, but is not limited to, a service mapper, a memory, and a processor. The service mapper includes, but is not limited to, computer code configured to receive a first notification from a service registry, the first notification indicating registration of a remote socket object, the remote socket object created in response to a request for a service at a first application; to request one or more active subscription from the service registry; to receive the one or more active subscription from the service registry; to select a subscription record from the received one or more active subscription, the subscription record associated with a second application and with the request for the service at the first application; to send the selected subscription record to the second application using a remote device port mapped to a localhost port; to receive a service record from the second application, wherein the service record includes a socket for communicating with the second application; to modify the received service record to include a localhost socket mapped to the socket; and to send the modified service record to the service registry, wherein the service registry registers the second application using information from the modified service record to facilitate distribution of the service between the first application and the second application. The memory stores the service mapper. The processor couples to the memory and is configured to execute the service mapper.

Still another exemplary embodiment of the invention relates to a system for facilitating distribution of a service between a first application and a second application. The system includes, but is not limited to, a service registry, a service mapper, one or more memory, and one or more processor. The service registry includes, but is not limited to, computer code configured to send a first notification to a service mapper, the first notification indicating registration of a remote socket object, the remote socket object created in response to a request for a service at a first application; to receive a request from the service mapper for one or more active subscription; to send the one or more active subscription to the service mapper; to receive a modified service record from the service mapper; to register a second application using information from the received modified service record; and to notify the first application of the second application to facilitate distribution of the service between the first application and the second application;

The service mapper includes, but is not limited to, computer code configured to receive the first notification; to request the one or more active subscription; to receive the one or more active subscription; to select a subscription record from the received one or more active subscription, the subscription record associated with a second application and with the request for the service at the first application; to send the selected subscription record to the second application using a remote device port mapped to a localhost port; to receive a service record from the second application, wherein the service record includes a socket for communicating with the second application; to modify the received service record to include a localhost socket mapped to the socket; and to send the modified service record to the service registry.

The one or more memory stores the service registry and the service mapper. The one or more processor couples to the one or more memory and is configured to execute the service registry and the service mapper.

Still another exemplary embodiment of the invention relates to a system for facilitating distribution of a service between a first application and a second application. The system includes, but is not limited to, a first device and a second device. The first device includes, but is not limited to, a first service mapper, a first communication interface, a first memory, and a first processor. The first service mapper includes, but is not limited to, computer code configured to receive a first notification from a service registry, the first notification indicating registration of a remote socket object, the remote socket object created in response to a request for a service at a first application; to request one or more active subscription from the service registry; to receive the one or more active subscription from the service registry; to select a subscription record from the received one or more active subscription, the subscription record associated with a second application and with the request for the service at the first application; to send the selected subscription record to a second device executing the second application using a remote device port mapped to a localhost port; to receive a service record from the second device, wherein the service record includes a socket for communicating with the second application; to modify the received service record to include a localhost socket mapped to the socket; and to send the modified service record to the service registry, wherein the service registry registers the second application using information from the modified service record to facilitate distribution of the service between the first application and the second application. The first communication interface is configured to send the selected subscription to the second device and to receive the service record from the second device. The first memory stores the first service mapper. The first processor couples to the first memory and to the first communication interface and is configured to execute the first service mapper.

The second device includes, but is not limited to, a second service mapper, a second memory, and a second processor. The second service mapper includes, but is not limited to, computer code configured to receive the selected subscription from the first device using a second communication interface and to send the service record to the first device using the second communication interface. The second memory stores the second service mapper. The second processor couples to the second memory and to the second communication interface and is configured to execute the second service mapper.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

DETAILED DESCRIPTION OF THE PREFERRED EMBODIMENTS

An IP-based framework to facilitate development of distributed applications is provided. To facilitate the development, the developer uses standard IP interfaces between distributed modules. Connection specific issues are hidden using the standard IP interfaces. The framework can be utilized in communication devices as well as other devices because less than 10 kilobyte of flash memory and less than 1 kilobyte of Random Access Memory (RAM) is required.

The term "client" as used herein includes a software component that uses a service component. The term "server" as used herein includes a software component that offers services to a client component. The term "service" as used herein includes any entity that can provide information, perform an action, or control a resource on behalf of another entity. A service may be implemented as software, hardware, or a combination of hardware and software. A network protocol defines a common set of rules and signals that devices on the network use to communicate.

The term "device" as used herein includes a variety of network nodes. Such network nodes include printers, workstations, servers (for example, printer servers or file servers), scanners, PCs of all form factors, intelligent appliances (for example, cameras, video cameras, TVs, DVD players, radios), etc. The devices communicate over a network using communication protocols such as, for example, Transmission Control Protocol/IP (TCP/IP) and User Datagram Protocol/Internet Protocol (UDP/IP). A device advertises its ability to perform a service.

Figure 1:
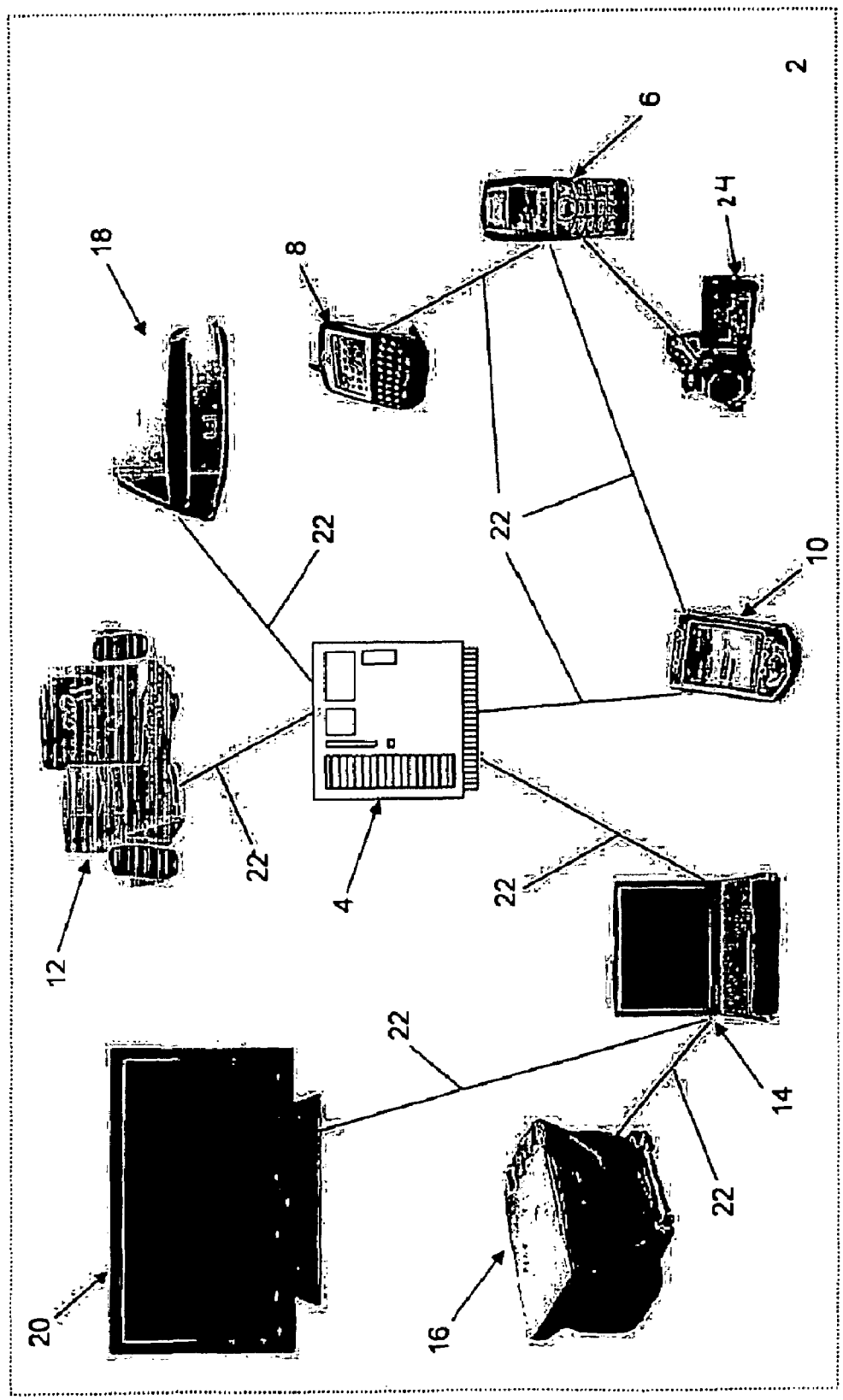
FIG. 1 is an overview diagram of a system in accordance with an exemplary embodiment.

With reference to FIG. 1, the system 2 includes, but is not limited to a hardware server 4 and a plurality of devices. The plurality of devices may comprise a cellular telephone 6, an ICD 8, a PDA 10, a PC 12 of any form factor including a laptop 14, a printer 16, a scanner 18, a TV 20, a video camera 24, etc. The devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), TCP/IP, UDP/IP, Short Messaging Service (SMS), Multimedia Messaging Service (MMS), e-mail, Instant Messaging, Bluetooth standard, IEEE 802.11, etc. The devices may communicate using various transmission media 22 that may be wired or wireless and include, but are not limited to, radio, infrared, laser, optical, USB, Ethernet, IEEE 1394, etc. The devices may connect through the hardware server 4 or may communicate directly with another device or a plurality of other devices that use the same or different transmission media. The network may include additional devices. Some or all of the devices of system 2 may a client component and/or a server component. The system 2 may comprise any combination of wired or wireless networks including, but not limited to, a cellular telephone network, a WLAN, a Bluetooth PAN, an Ethernet LAN, a token ring LAN, a wide area network, the Internet, etc. The system 2 may include both wired and wireless devices.

Figure 2:
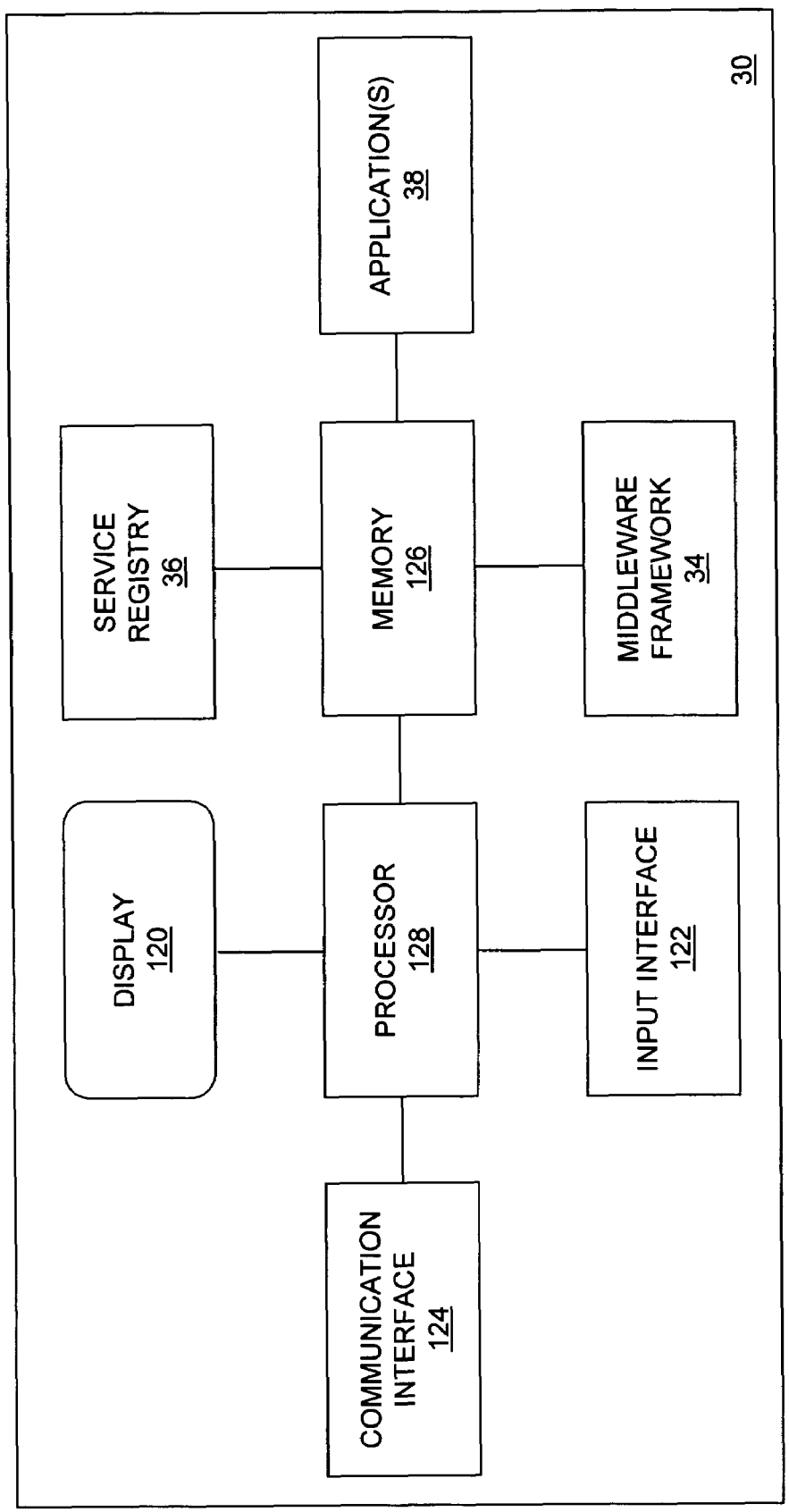
FIG. 2 is a block diagram of a device in accordance with an exemplary embodiment.

With reference to FIG. 2, the device 30 includes, but is not limited to, a display 120, an input interface 122, a communication interface 124, a memory 126, a processor 128, one or more application 38, a middleware framework 34, and a service registry 36. Different and additional components may be incorporated into the device 30. The display 120 of the device 30 is optional. The display 120 presents information to a user. The display 120 may be a thin film transistor (TFT) display, a light emitting diode (LED) display, a Liquid Crystal Display (LCD), or any of a variety of different displays known to those skilled in the art now or in the future.

The input interface 122 provides an interface for receiving information from the user for entry into the device 30. The input interface 122 may use various input technologies including, but not limited to, a keyboard, a pen and touch screen, a mouse, a track ball, a touch screen, a keypad, one or more buttons, etc. to allow the user to enter information into the device 30 or to make selections. The input interface 122 may provide both an input and an output interface. For example, a touch screen both allows user input and presents output to the user. The input interface 122 of the device 30 is optional.

The communication interface 124 provides an interface for receiving and transmitting calls, messages, files, and any other information communicable between devices. Communications between the device 30 and other devices may be through one or more of the following connection methods, without limitation: an infrared communications link, a radio frequency communication link, a wireless communications link, a cellular network link, a link established according to TCP/IP, etc. Transferring content to and from the device may be through one or more of these connection methods. The device 30 may communicate using various transmission technologies including, but not limited to, CDMA, GSM, UMTS, TDMA, TCP/IP, Bluetooth, IrDA, RFID, etc. The device 30 may communicate using various media including, but not limited to, radio, infrared, laser, optical, USB, Ethernet, IEEE 1394, etc.

The memory 126 stores the one or more application 38, the middleware framework 34, and/or the service registry 36. The one or more application 38, the middleware framework 34, and the service registry 36 may be stored in the same or different memory 126. The device 30 may have one or more memory 126 that uses the same or a different memory technology. Memory technologies include, but are not limited to, RAM, Read Only Memory (ROM), flash memory, etc.

The processor 128 executes instructions that cause the device 30 to behave in a predetermined manner. The instructions may be written using one or more programming language, scripting language, assembly language, etc. Additionally, the instructions may be carried out by a special purpose computer, logic circuits, or hardware circuits. Thus, the processor 128 may be implemented in hardware, firmware, software, or any combination of these methods. The term "execution" is the process of running a program or the carrying out of the operation called for by an instruction. The processor 128 executes an instruction, meaning that it performs the operations called for by that instruction. The processor 128 couples to the communication interface 124 to relay received information from another device to the one or more application 38, the middleware framework 34, and/or the service registry 36 or to send information from the one or more application 38, the middleware framework 34, and/or the service registry 36 to another device.

The processor 34 may retrieve a set of instructions from a permanent memory device and copy the instructions in an executable form to a temporary memory device. The temporary memory device is generally some form of RAM. The data in RAM is volatile meaning that it remains only as long as the device is turned on. When the device is turned off, RAM loses its data. ROM refers to special memory used to store programs that boot the device and perform diagnostics. The values stored in ROM are always there, whether the power is on or not. Flash memory is a type of constantly-powered nonvolatile memory that can be erased and reprogrammed in units of memory called blocks.

The one or more application 38 may be a distributed application that uses the middleware framework 34, and/or the service registry 36 to provide a service to another application 38 or to receive a service from another application 38 without either application knowing of the other's existence. Each application understands how to connect to and access the service registry 36. Each service publishes itself using service records to the service registry 36 without knowing the client of the service. The client understands at least an Application Program Interface (API) of the service to which it subscribes though it does not know where the service is located. The client locates the service through a service record received from the service registry 36 that describes the service and the location or connection parameters to the service. For example, the one or more application 38 may be an instant messaging application that has multiple instances that connect with each other. As another example, the one or more application 38 may be an SMS application. The actual SMS sender service may exist in a first device and the user interface of the application in a second device. The main characteristic of the one or more application 38 is that the applications are composed of multiple parts that may be executed by a different processor possibly using a different operating system. Thus, the one or more application 38 may be distributed between multiple devices that are in communication.

The one or more application 38, the middleware framework 34, and the service registry 36 are organized sets of instructions that, when executed, cause the device 30 to behave in a predetermined manner. The instructions may be written using one or more programming languages, assembly languages, scripting languages, etc.

Figure 3:
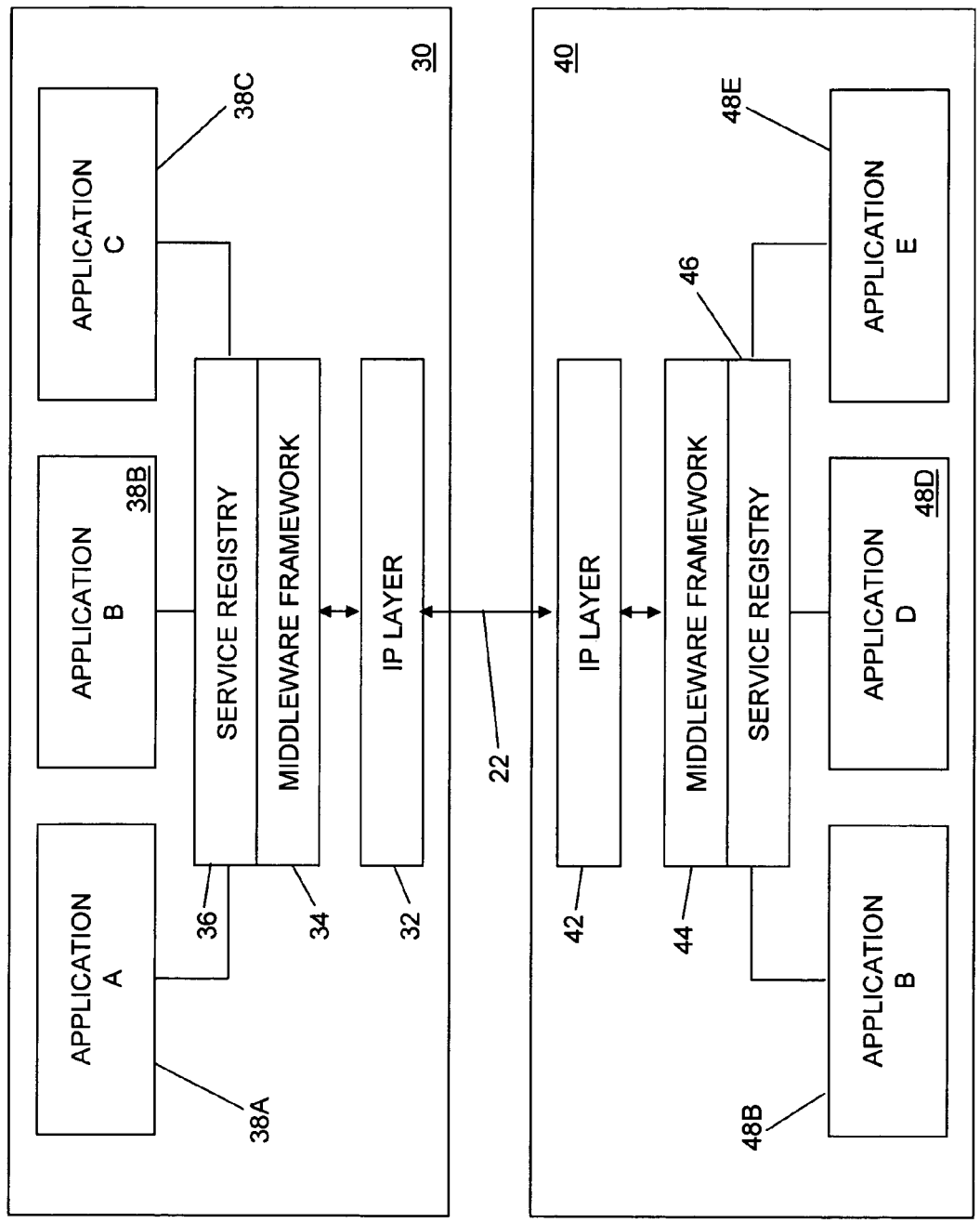
FIG. 3 is a block diagram of a system for facilitating distribution of a service between applications in accordance with an exemplary embodiment.

To facilitate the distribution of the one or more application 38, the middleware framework 34 interfaces with three basic modules: a client component, a server component, and the service registry 36. With reference to FIG. 3, the device 30 communicates with a second device 40 through the transmission media 22. The device 30 includes, but is not limited to, an application A 38A, an application B 38B, an application C 38C, the service registry 36, the middleware framework 34, and an IP layer 32. TCP/IP is composed of layers. The IP layer 32 provides the "virtual network" image of the internet by shielding the higher levels (i.e. TCP and Application) from the network architecture below it. The IP layer 32 interfaces directly with the communication interface and hardware. Each physical network has its own technology-dependent communication interface that is implemented in the form of a programming interface that provides basic communication functions. The IP layer 32 provides a common interface between devices independent of the underlying physical network.

The service registry 36, in an exemplary embodiment, is implemented as a software component that stores one or more service record created for a service provided by a server component and that processes a service subscription that has been created by a client component. Thus, the service registry 36 handles service record registration and subscription. The service registry 36 may include, but is not limited to two databases: one for registered service records from and the other for currently valid service subscriptions. The service registry 36 actions, in an exemplary embodiment, include: registration/unregistration of applications, subscription/unsubscription of applications, notification of applications, and acknowledge messages from applications. The service registry 36 detects the appearance/disappearance of a subscribed service and notifies the client component using a second service record to the client component. Through transmission of the first and second service record through the service registry 36, the client component may connect to the service provided by the server component. The middleware framework 34 allows the distributed application client and server components to focus on interaction with the service registry 36 as will be described in more detail relative to FIG. 4.

With reference to FIG. 3, the device 40 includes, but is not limited to, an application B 48B, an application D 48D, an application E 438E, a service registry 46, a middleware framework 44, and an IP layer 42. The IP layer 42 interfaces directly with the network interface and hardware. The service registry 46, the middleware framework 44, and the IP layer 42 are similar in function respectively to the service registry 36, the middleware framework 34, and the IP layer 32 of the device 30.

The application B 38B of device 30 may include a client component; whereas the application B 48B of device 40 may include a server component that may provide a service for the client component of the application B 38B, for example. Initially, the server component of the application B 48B of device 40 registers itself and the service using a first service record to the service registry 46. When the client component of the application B 38B begins execution, the client component subscribes to information concerning a specific service or services that it needs to execute using a service record sent to the service registry 36. The service record, in an exemplary embodiment, is a data structure that describes a service. The service record, in an exemplary embodiment, contains a service name, an IP address, and a UDP port. The service record may additionally contain an application protocol, a version number, PKI-keys, etc.

Figure 4:
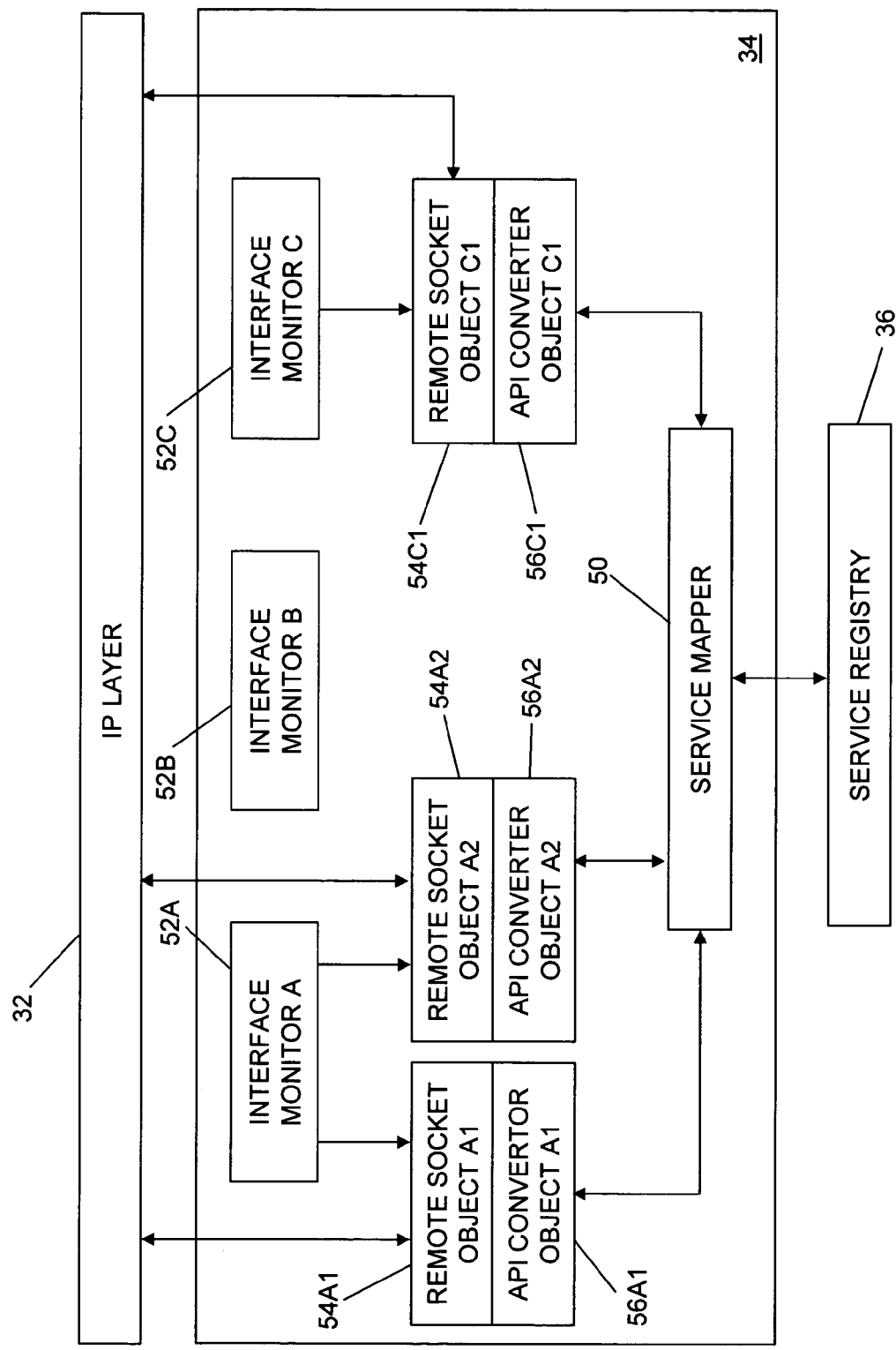
FIG. 4 is a block diagram of a middleware framework that facilitates distribution of a service between applications in accordance with an exemplary embodiment.

With reference to FIG. 4, the middleware framework 34, in an exemplary embodiment, is composed of four software modules: an interface monitor, a remote socket object, an API convertor object, and a service mapper 50. The interface monitor is a communication interface specific link level module that monitors the communication interface and creates a remote socket object and an API convertor object when another interface monitor is detected. The API convertor object abstracts the communication interface specific issues out of the connection established between applications. The remote socket object uses the API convertor object. The remote socket object provides access to another remote socket object that exists at the other end of an established connection. When the connection is lost or terminated, the remote socket object may delete itself. When the connection is reestablished, the interface monitor creates a new remote socket object and API convertor object. Thus, as shown with reference to FIG. 4, an interface monitor may be created for each communication interface provided at the device 30. For example, the device 30 may include three different communication interfaces that correspond to an interface monitor A 52A, an interface monitor B 52B, and an interface monitor C 52C. For each connection currently supported through the communication interface, the interface monitor creates the remote socket object and the API convertor object. Thus, for example, the interface monitor A 52A may support a first connection A1 and a second connection A2. In response, the interface monitor A 52A creates a remote socket object A1 54A1, an API convertor object A1 56A1, a remote socket object A2 54A2, and an API convertor object A2 56A2. The interface monitor C 52C may similarly create a remote socket object C1 54 C1 and an API convertor object C1 56 C1.

The remote socket object is a service that registers itself with the service registry when created. When the remote socket object is deleted, the remote socket object removes itself from the service registry. Through the API convertor object, an open (localhost) socket may be opened from another device localhost. A socket is a mechanism for creating a virtual connection between processes. Sockets interface the operating system standard input/output with the network communication interfaces. The socket has associated with it a socket address that includes a port number and the network address of the local host. The socket may be completely implemented in software. For example, the service registry may be at UDP port 4242. To access the service registry locally, the socket: localhost:4242 is used. To access another device, the API convertor object creates and sends a service record to an API convertor object at the other device and requests localhost:4242. The remote socket object maps the socket on the remote device (for example, device 40) to appear at some other socket locally, for example localhost: 10001. Each application may have a unique port number associated with it. For example, some protocols, e.g. telnet, the HyperText Transport Protocol (HTTP), the Simple Mail Transport Protocol (SMTP) have default ports though other ports may be used as well.

Use of the interface monitor, the remote socket object, and the API convertor object provides a system where an application can connect to sockets in another device. As a result, communication interface independence and non-IP to IP scalability have been accomplished. However, the application must understand how to use the remote socket object. The service mapper 50 provides a mechanism whereby the distributed application parts (client/server) only need to know how to interact with the service registry by introducing the remote services through the service registry as local services. The service mapper 50, in an exemplary embodiment, is a software component that seeks services from other devices based on the current need in the device. Externally, the device does not request any service that is not currently needed. Traditional service discovery protocols (i.e. UPnP, Rendezvous, Bluetooth SDP) advertise all of the services that are available on the device. Using the middleware framework 34, services are not advertised, but are instead requested when needed. The service mapper 50 is the only client that interfaces with the remote socket object. The service mapper 50 determines what services are subscribed to locally and sends that subscription information to a remote device service registry. The remote device service registry responds only if there is a match between the service subscription and a service provided at the remote device. If there is a match, the service mapper 50 allocates a socket locally and maps that to the remote service. The service mapper 50 allocates a localhost socket and modifies the remote service record to match the allocated localhost socket. The service mapper 50 modifies the service record to include the locally allocated port and registers the modified service record with the service registry.

Figure 5:
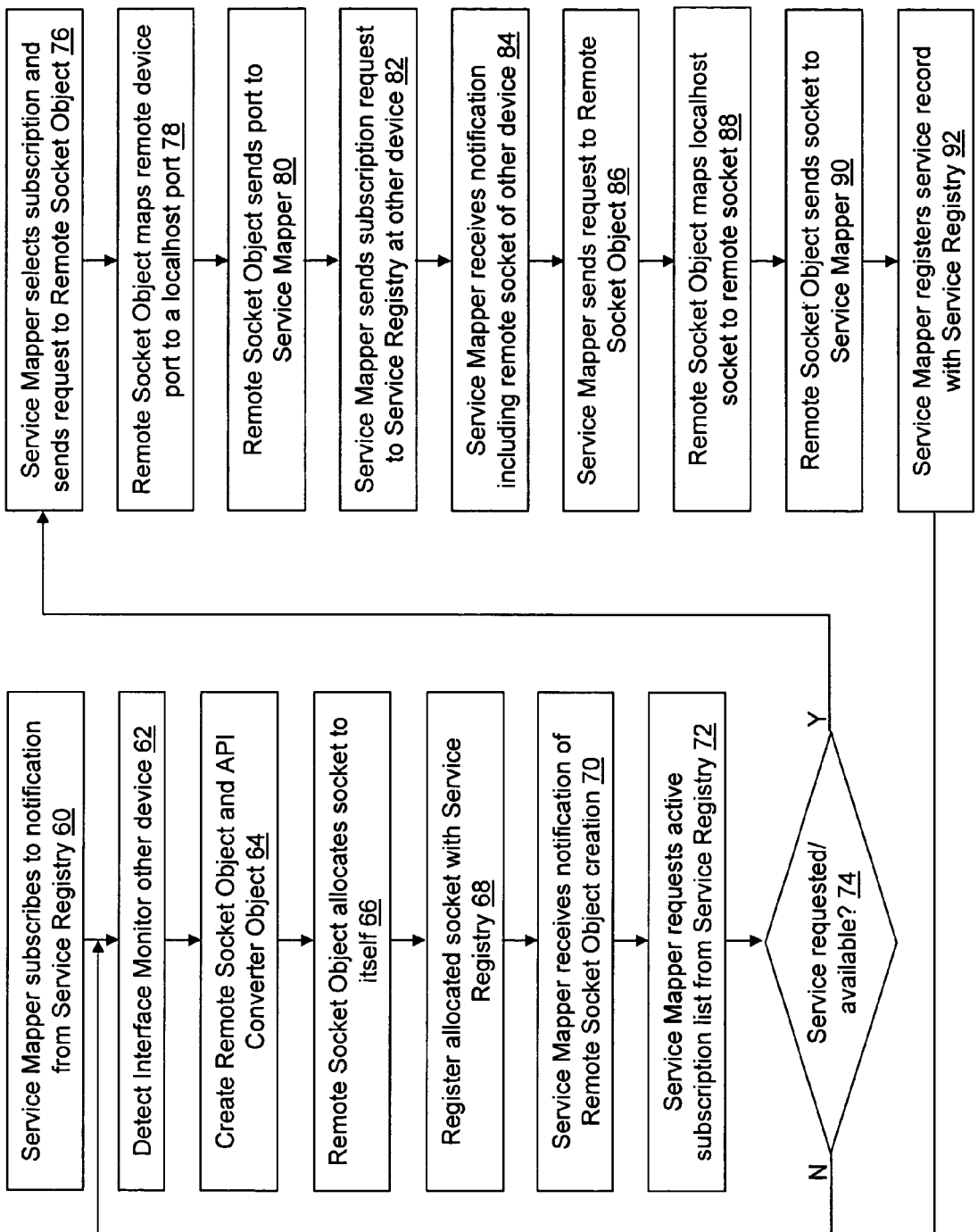
FIG. 5 is a first flow diagram of operations associated with the middleware framework of FIG. 3 in accordance with an exemplary embodiment.
Figure 6:
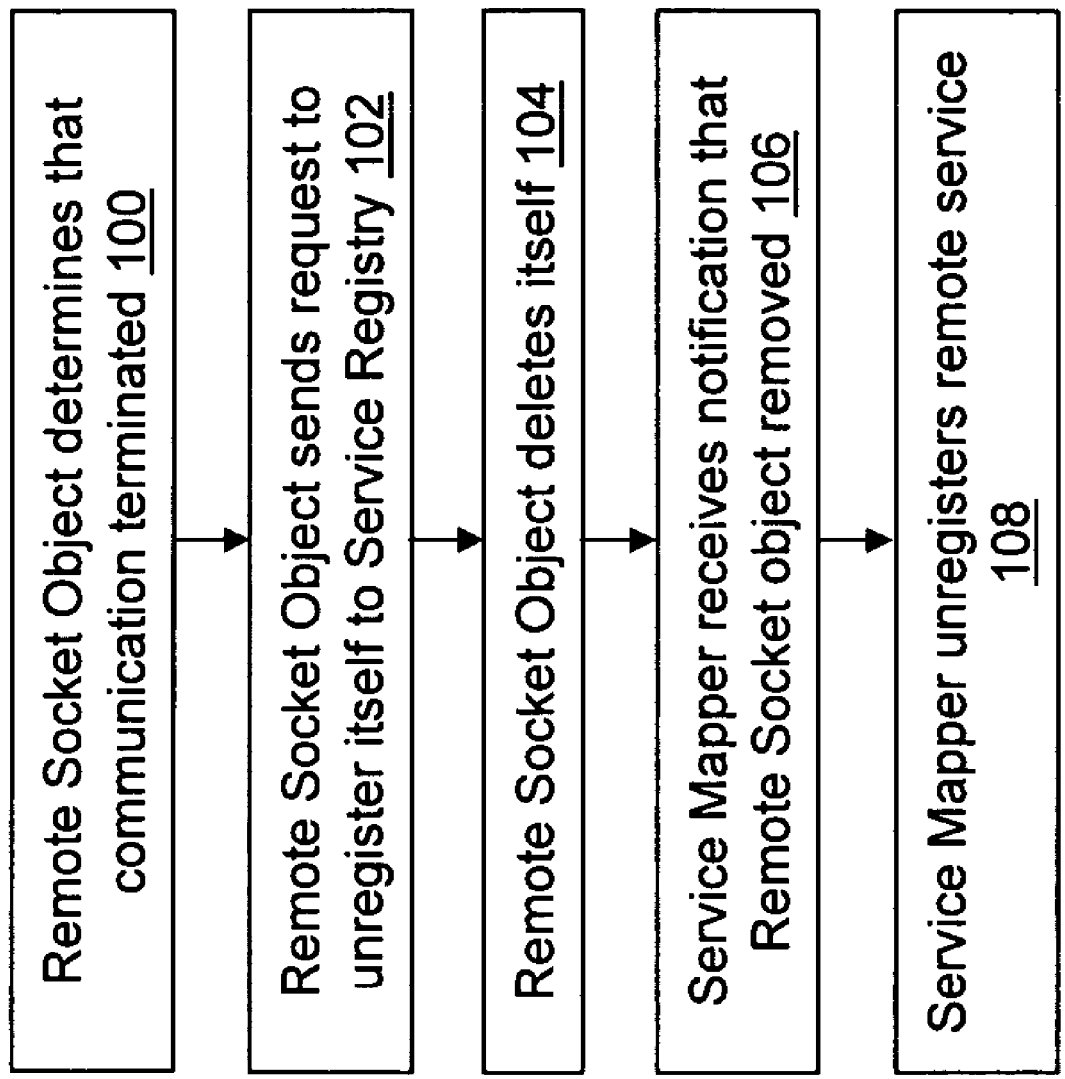
FIG. 6 is a second flow diagram of operations associated with the middleware framework of FIG. 3 in accordance with an exemplary embodiment.

FIGS. 5 and 6 include exemplary operations of the middleware framework 34. At an operation 60, the service mapper 50 subscribes to a notification from the service registry 36 whenever a remote socket object is created by the interface monitor. At an operation 62, the interface monitor detects another device. At an operation 64, the interface monitor creates the remote socket object and the API convertor object. The created remote socket object allocates a localhost socket to itself at an operation 66. The created remote socket object registers the allocated localhost socket with the service registry 36 using a service record at an operation 68. An example service record may be:
<RemoteSocket><Localhost><10001><version 1.0>.

At an operation 70, the service mapper 50 receives notification of the creation of the remote socket object from the service registry as a result of the subscription. At an operation 72, the service mapper 50 requests an active subscription list from the service registry 36. The active subscription list specifies what services the other system clients are currently interested in. The test at operation 74 determines if the active subscription list is empty or not. If the active subscription list is empty because no service has been requested or is available from other applications, nothing further happens until another device is detected by the interface monitor. If the active subscription list is not empty, processing continues at operation 76.

At an operation 76, the service mapper selects a subscription record from the active subscription list and sends a request to the remote socket object. The selected subscription record is associated with a request for a service at a first application and a corresponding service subscription by a second application. At an operation 78, the remote socket object maps a remote device port to a localhost port. At an operation 80, the remote socket object sends the allocated port to the service mapper 50. At an operation 82, the service mapper 50 sends the subscription request to the service registry at the other device (for example, the service registry 46 at the second device 40). At an operation 84, the service mapper 50 receives a notification from the other device. The notification is a service record that includes a remote socket for communicating with the second application at the other device. At an operation 86, the service mapper sends the received notification to the remote socket object. The remote socket object maps a localhost socket to the remote socket at an operation 88. The remote socket object modifies the received notification to include the allocated localhost socket and sends the modified notification to the service mapper at an operation 90. At an operation 92, the service mapper 50 registers the received service record with the service registry. When the service mapper 50 registers the remote service, the service registry 36 generates a notification to the client component that originally created the subscription. The client component makes a connection with the server component based on the information received in the service record of the notification. The information points to the localhost socket that is then routed using the remote socket object to the service in the other device.

For example, a subscription for a chat service exists at the device 30. The service mapper 50 uses an API convertor object and requests a remote socket object to map remote device port 4242 used by the service registry 36 to some localhost port. As a reply from the remote socket object, the service mapper 50 is allocated this port. The remote socket object passes the chat service subscription to this newly allocated port where it is immediately transported to the service registry 46 at the second device 40. A chat service exists in the second device 40. At the second device 40, a notification, for example <CHAT><localhost><8999>, is generated and sent to the device 30 using the remote socket at the device 30. As a result, the service mapper 50 knows the socket where the remote device provides chat service. The service mapper 50 maps a localhost socket to the remote socket using the API convertor object. The service mapper 50 modifies the received service record, for example as <CHAT><localhost><9999><RemoteSocket8999>, and registers the modified record with the service registry 36.

At some point, the communication between the client component and the server component is terminated. FIG. 6 depicts exemplary operations in response to a terminated connection. At an operation 100, the remote socket object determines that the communication has terminated. In response, the remote socket object, at an operation 102, sends a request to the service registry 36 to unregister the remote socket object. At an operation 104, the remote socket object deletes itself. The service mapper 50 receives notification from the service registry, at an operation 106, that the remote socket object has been removed. At an operation 108, the service mapper 50 unregisters the remote service. The service registry 36 notifies those client components that have subscribed to services provided through the connection. Based on the notification, the client components may run "connection lost" exception routines thereby changing their behavior.

Because the service mapper is notified immediately when a remote socket object is created or deleted, the provided system responds quickly to appearing and to disappearing services. The transmission of data between devices is minimized because only subscriptions are transported between devices. Because the distributed application only needs to know how to use the service registry and the IP stack, the system is independent of the communication interface, and thus, allows the distributed application developer to develop a single application that supports different communication interfaces even those defined in the future. Thus, the applications will work using future communication technologies without modification. As a result, a scalable, low cost and fast system response is provided for distributed applications.

It is understood that the invention is not confined to the particular embodiments set forth herein as illustrative, but embraces all such modifications, combinations, and permutations as come within the scope of the following claims. For example, the present invention is not limited to a particular operating environment. Additionally, the functionality described may be implemented in a single executable or application or may be distributed among modules or managers that differ in number and distribution of functionality from those described herein without deviating from the spirit of the invention. Additionally, the order of execution of the functions may be changed without deviating from the spirit of the invention. Thus, the description of the preferred embodiments is for purposes of illustration and not limitation.

What is claimed is:

1. A service mapping method for facilitating distribution of a service between a first application and a second application, the method comprising:

receiving a first notification from a service registry, the first notification indicating registration of a remote socket object, the remote socket object created by a service mapper in response to a request for a service at a first application;

requesting, by the service mapper, one or more active subscription from the service registry;

receiving, by the service mapper, the one or more active subscription from the service registry;

selecting, by the service mapper, a subscription record from the received one or more active subscription, the subscription record associated with a second application and with the request for the service at the first application;

sending the selected subscription record from the service mapper to the second application using a remote device port mapped to a localhost port;

receiving, by the service mapper, a service record from the second application, wherein the service record includes a socket for communicating with the second application;

modifying, by the service mapper, the received service record to include a localhost socket mapped to the socket; and sending the modified service record to the service registry from the service mapper, wherein the service registry registers the second application using information from the modified service record to facilitate distribution of the service between the first application and the second application.

2. The method of claim 1, further comprising sending a second notification to the service registry, wherein the second notification includes a request to receive the first notification when any remote socket object registers with the service registry.

3. The method of claim 1, wherein the service is selected from the group consisting of a chat service, an e-mail service, an instant messaging service, and an information transfer service.

4. The method of claim 1, further comprising:

creating a remote socket object in response to a detected communication interface;

allocating a socket to the created remote socket object; and sending the allocated socket to the service registry for registration.

5. The method of claim 1, further comprising:

receiving a second notification from the service registry, the second notification indicating unregistration of the remote socket object; and sending a third notification to the service registry, wherein the third notification is to request unregistration of the second application.

6. The method of claim 5, further comprising:

determining that communication between the first application and the second application has terminated; and sending a fourth notification to the service registry, wherein the fourth notification is to request unregistration of the remote socket object.

7. The method of claim 1, further comprising:

sending a port mapping request to the remote socket object, wherein the remote socket object maps the remote device port to the localhost port; and receiving a port mapping reply from the remote socket object, wherein the port mapping reply includes the remote device port mapped to the localhost port.

8. The method of claim 1, further comprising:

sending a socket mapping request to the remote socket object, wherein the remote socket object maps the localhost socket to the socket; and receiving a socket mapping reply from the remote socket object, wherein the socket mapping reply includes the localhost socket mapped to the remote device socket.

9. A computer program product, embodied on a computer readable medium, for facilitating distribution of a service between a first application and a second application, the computer program product comprising:
   computer code configured to
      receive a first notification from a service registry, the first notification indicating registration of a remote socket object, the remote socket object created in response to a request for a service at a first application;
      request one or more active subscription from the service registry;
      receive the one or more active subscription from the service registry;
      select a subscription record from the received one or more active subscription, the subscription record associated with a second application and with the request for the service at the first application;
      send the selected subscription record to the second application using a remote device port mapped to a localhost port;
      receive a service record from the second application, wherein the service record includes a socket for communicating with the second application;
      modify the received service record to include a localhost socket mapped to the socket; and
      send the modified service record to the service registry, wherein the service registry registers the second application using information from the modified service record to facilitate distribution of the service between the first application and the second application.

10. The computer program product of claim 9, wherein the computer code is further configured to send a second notification to the service registry, wherein the second notification includes a request to receive the first notification when any remote socket object registers with the service registry.

11. The computer program product of claim 9, wherein the service is selected from the group consisting of a chat service, an e-mail service, an instant messaging service, and an information transfer service.

12. The computer program product of claim 9, wherein the computer code is further configured to:
   create a remote socket object in response to a detected communication interface;
   allocate a socket to the created remote socket object; and
   send the allocated socket to the service registry for registration.

13. The computer program product of claim 9, wherein the computer code is further configured to:
   receive a second notification from the service registry, the second notification indicating unregistration of the remote socket object; and
   send a third notification to the service registry, wherein the third notification is to request unregistration of the second application.

14. The computer program product of claim 13, wherein the computer code is further configured to:
   determine that communication between the first application and the second application has terminated; and
   send a fourth notification to the service registry, wherein the fourth notification is to request unregistration of the remote socket object.

15. The computer program product of claim 9, wherein the computer code is further configured to:
   send a port mapping request to the remote socket object, wherein the remote socket object maps the remote device port to the localhost port; and
   receive a port mapping reply from the remote socket object, wherein the port mapping reply includes the remote device port mapped to the localhost port.

16. The computer program product of claim 9, wherein the computer code is further configured to:
   send a socket mapping request to the remote socket object, wherein the remote socket object maps the localhost socket to the socket; and
   receive a socket mapping reply from the remote socket object, wherein the socket mapping reply includes the localhost socket mapped to the remote device socket.

17. A device for facilitating distribution of a service between a first application and a second application, the device comprising:
   a service mapper, the service mapper comprising computer code configured to
      receive a first notification from a service registry, the first notification indicating registration of a remote socket object, the remote socket object created in response to a request for a service at a first application;
      request one or more active subscription from the service registry;
      receive the one or more active subscription from the service registry;
      select a subscription record from the received one or more active subscription, the subscription record associated with a second application and with the request for the service at the first application;
      send the selected subscription record to the second application using a remote device port mapped to a localhost port;
      receive a service record from the second application, wherein the service record includes a socket for communicating with the second application;
      modify the received service record to include a localhost socket mapped to the socket; and
      send the modified service record to the service registry, wherein the service registry registers the second application using information from the modified service record to facilitate distribution of the service between the first application and the second application;
   a memory, wherein the memory stores the service mapper; and
   a processor coupled to the memory, the processor configured to execute the service mapper.

18. The device of claim 17, wherein the service mapper further comprises computer code configured to send a second notification to the service registry, wherein the second notification includes a request to receive the first notification when any remote socket object registers with the service registry.

19. The device of claim 17, wherein the service is selected from the group consisting of a chat service, an e-mail service, an instant messaging service, and an information transfer service.

20. The device of claim 17, wherein the service mapper further comprises computer code configured to:
   create a remote socket object in response to a detected communication interface; allocate a socket to the created remote socket object; and
   send the allocated socket to the service registry for registration.

21. The device of claim 17, wherein the service mapper further comprises computer code configured to:

receive a second notification from the service registry, the second notification indicating unregistration of the remote socket object; and send a third notification to the service registry, wherein the third notification is to request unregistration of the second application.

22. The device of claim 21, wherein the service mapper further comprises computer code configured to:

determine that communication between the first application and the second application has terminated; and send a fourth notification to the service registry, wherein the fourth notification is to request unregistration of the remote socket object.

23. The device of claim 17, wherein the service mapper further comprises computer code configured to:

send a port mapping request to the remote socket object, wherein the remote socket object maps the remote device port to the localhost port; and receive a port mapping reply from the remote socket object, wherein the port mapping reply includes the remote device port mapped to the localhost port.

24. The device of claim 17, wherein the service mapper further comprises computer code configured to:

send a socket mapping request to the remote socket object, wherein the remote socket object maps the localhost socket to the socket; and receive a socket mapping reply from the remote socket object, wherein the socket mapping reply includes the localhost socket mapped to the remote device socket.

25. A system for facilitating distribution of a service between a first application and a second application, the system comprising:

a service registry, the service registry comprising computer code configured to send a first notification to a service mapper, the first notification indicating registration of a remote socket object, the remote socket object created in response to a request for a service at a first application;

receive a request from the service mapper for one or more active subscription;

send the one or more active subscription to the service mapper;

receive a modified service record from the service mapper;

register a second application using information from the received modified service record; and notify the first application of the second application to facilitate distribution of the service between the first application and the second application;

the service mapper comprising computer code configured to receive the first notification;

request the one or more active subscription;

receive the one or more active subscription;

select a subscription record from the received one or more active subscription, the subscription record associated with a second application and with the request for the service at the first application;

send the selected subscription record to the second application using a remote device port mapped to a localhost port;

receive a service record from the second application, wherein the service record includes a socket for communicating with the second application;

modify the received service record to include a localhost socket mapped to the socket; and send the modified service record to the service registry;

one or more memory, wherein the one or more memory stores the service registry and the service mapper; and one or more processor coupled to the one or more memory, the one or more processor configured to execute the service registry and the service mapper.

26. A system for facilitating distribution of a service between a first application and a second application, the system comprising:

a first device, the first device comprising a first service mapper, the first service mapper comprising computer code configured to:

receive a first notification from a service registry, the first notification indicating registration of a remote socket object, the remote socket object created in response to a request for a service at a first application;

request one or more active subscription from the service registry;

receive the one or more active subscription from the service registry;

select a subscription record from the received one or more active subscription, the subscription record associated with a second application and with the request for the service at the first application;

send the selected subscription record to a second device executing the second application using a remote device port mapped to a localhost port;

receive a service record from the second device, wherein the service record includes a socket for communicating with the second application;

modify the received service record to include a localhost socket mapped to the socket; and send the modified service record to the service registry, wherein the service registry registers the second application using information from the modified service record to facilitate distribution of the service between the first application and the second application;

a first communication interface, the first communication interface configured to send the selected subscription to the second device and to receive the service record from the second device;

a first memory, wherein the first memory stores the first service mapper; and a first processor coupled to the first memory and to the first communication interface, the first processor configured to execute the first service mapper; and the second device comprising a second service mapper, the second service mapper comprising computer code configured to receive the selected subscription from the first device using a second communication interface; and send the service record to the first device using the second communication interface;

a second memory, wherein the second memory stores the second service mapper; and a second processor coupled to the second memory and to the second communication interface, the second processor configured to execute the second service mapper.

* * * * *